United States Patent [19]
Bringmann

[11] 3,866,649
[45] Feb. 18, 1975

[54] SHOPPING CART HANDLE COVER

[76] Inventor: William F. Bringmann, 49 Grove St., Waterbury, Conn. 06710

[22] Filed: Nov. 5, 1973

[21] Appl. No.: 392,686

[52] U.S. Cl............. 150/52 R, 46/32, 280/33.99 A
[51] Int. Cl............................ B62b 5/00, B62b 9/26
[58] Field of Search............ 46/32; 150/52 R, 52 L, 150/52 K, 52 M; 74/558.5; 280/33.99 A, 33.99 B; 161/7, 8, 12

[56] References Cited
UNITED STATES PATENTS

| | | | |
|---|---|---|---|
| 571,025 | 11/1896 | Spamer | 150/52 R UX |
| 1,876,993 | 9/1932 | Manning | 150/52 M |
| 2,330,538 | 9/1943 | Allen | 46/32 UX |
| 2,402,861 | 6/1946 | Winnick | 46/32 |
| 2,762,161 | 9/1956 | Danielson | 46/32 |
| 2,918,741 | 12/1959 | Welter | 280/33.99 A |
| 2,972,819 | 2/1961 | Graham | 161/8 UX |
| 2,997,311 | 8/1961 | Umanoff | 280/33.99 B |
| 3,087,277 | 4/1963 | McCook | 46/32 X |
| 3,251,543 | 5/1966 | Bush | 280/33.99 A |
| 3,313,333 | 4/1967 | Lordi | 150/52 R X |

*Primary Examiner*—Donald F. Norton
*Attorney, Agent, or Firm*—Philip T. Paul

[57] ABSTRACT

A removable shopping cart handle cover containing a string of ornaments useful when shopping with a child is described. The cover provides a sanitary surrounding for the child and the ornaments keep him amused.

2 Claims, 6 Drawing Figures

PATENTED FEB 18 1975　　　　　　　　　　　　　　　　　　　　3,866,649

SHOPPING CART HANDLE COVER

DETAILED DESCRIPTION

Shopping carts are a routine convenience for shoppers in grocery stores and supermarkets. Many of these carts are equipped with a seat in which an infant can be placed while the mother is shopping. The infant faces the rear and holds on to the handle.

Shopping carts being around food and being handled by so many persons are not at all sanitary. It is particularly desireable that the infant be protected from this contamination. Further, an infant who is squirming in his seat and making a commotion is a distraction to the mother while shopping.

I have found that these and other problems can be corrected by the use of a removable cover for a shopping cart handle comprised of a covering material cut to fit the handle and a string of ornaments attached to the outside of the covering material.

Figure 1:
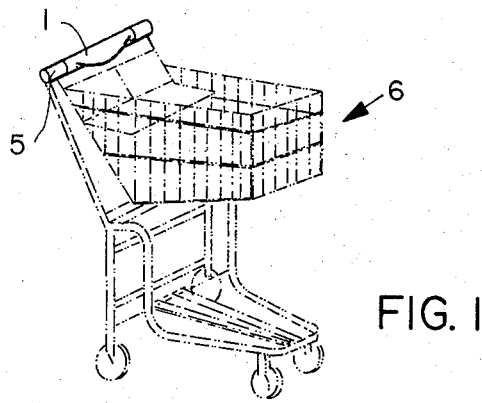

The covering material may be cloth or a flexible plastic such as polyvinyl chloride. It can be fastened to the handle by a closure means such as a zipper, snap grippers, tape fasteners, hook and loop tapes or by tie strings at either end. The string of ornaments may consist of colored beads, small bells or plastic figurines FIG. 1 is a perspective of the cover 1 attached to the handle 5 of the shopping cart 6.

Figure 2:
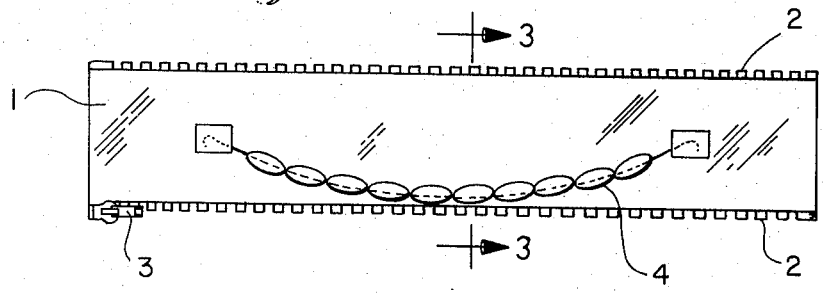

FIG. 2 is a plan view of the cover 1 showing the positioning of the zipper 2, the zipper closure 3 and the ornaments 4.

Figure 3:
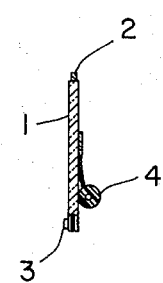

FIG. 3 is a vertical section view of FIG. 2.

Figure 4:
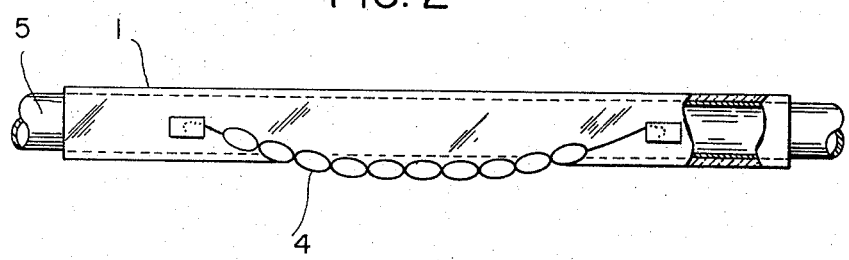

FIG. 4 is a view of the cover 1 attached to the handle 5 with the ornaments 4 in view.

Figure 5:
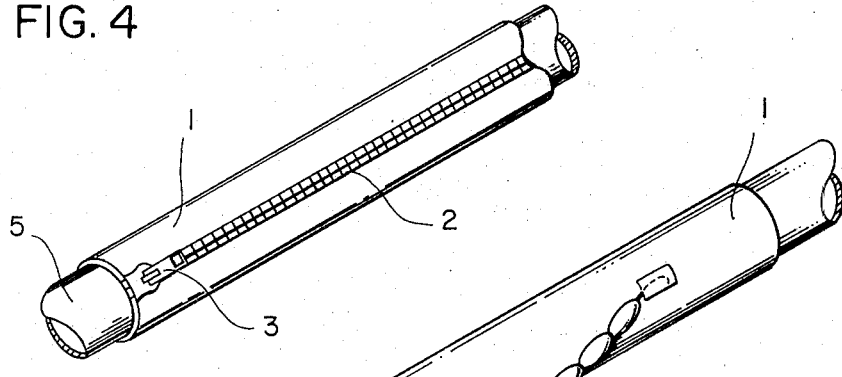

FIG. 5 is a perspective of the cover 1 attached to the shopping cart handle 5 with the zipper 2 and the zipper closure 3 in view.

Figure 6:
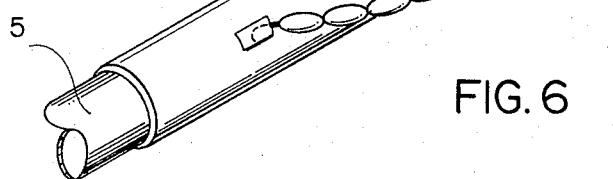

FIG. 6 is a perspective of the cover 1 attached to the shopping cart handle 5 with the ornaments 4 in view. In use, the mother attaches the cover 1 to the handle 5 by means of the zipper 2, does her shopping and removes it when she is finished. During this time the infant is protected by the covering and amused by the ornaments 4.

I claim:

1. A removable cover for a shopping cart handle comprised of a sheet of flexible plastic cut to fit the handle, a zipper for binding the sheet of flexible plastic to the handle and a string of ornaments loosely attached to the outside of the sheet of flexible plastic.

2. The cover of claim 1, wherein the covering material is plasticized polyvinyl chloride.

* * * * *